V. KUBELKA.
CHAIN TIGHTENING AND LOCKING DEVICE.
APPLICATION FILED FEB. 2, 1922.

1,431,012.

Patented Oct. 3, 1922.

WITNESSES
E. W. Wilson
F. J. Foster

INVENTOR
V. Kubelka
BY
ATTORNEYS

Patented Oct. 3, 1922.

1,431,012

UNITED STATES PATENT OFFICE.

VRATISLAV KUBELKA, OF BROOKLYN, NEW YORK.

CHAIN TIGHTENING AND LOCKING DEVICE.

Application filed February 2, 1922. Serial No. 533,663.

*To all whom it may concern:*

Be it known that I, VRATISLAV KUBELKA, a citizen of the United States, and a resident of the city of New York, borough of Brooklyn, in the county of Kings and State of New York, have invented a new and Improved Chain Tightening and Locking Device, of which the following is a full, clear, and exact description.

This invention relates to improvements in chain locking and tightening devices, an object of the invention being to provide a device of this character which is primarily adapted for use in connection with tire chains, and a device which will serve to securely lock the ends of a chain together as well as stretching the same tightly around the tire so that there is no danger of its slipping off. It is to be understood in the first instance, that the chain tightener and lock might have other uses and that the novel form of lever mechanism herein described may be used for tightening and locking various types of chains.

A further object is to provide a chain tightener and lock, which will be simple and practical in construction, durable and efficient in use, easy to operate and comparatively inexpensive to manufacture.

With these and other objects in view, the invention consists in certain novel features of construction, and combinations and arrangements of parts as will be more fully hereinafter described and pointed out in the claims.

Figure 1:
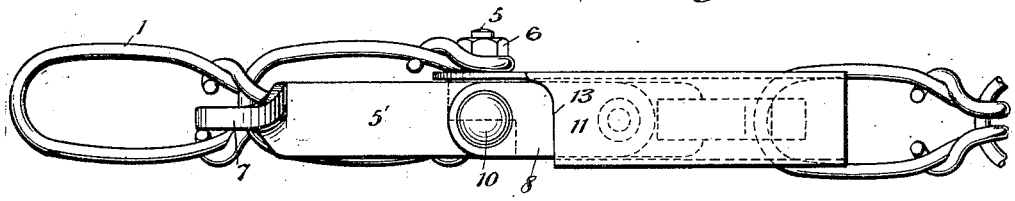
Figure 1 is a top plan view showing my improved device in locked position.
Figure 2:
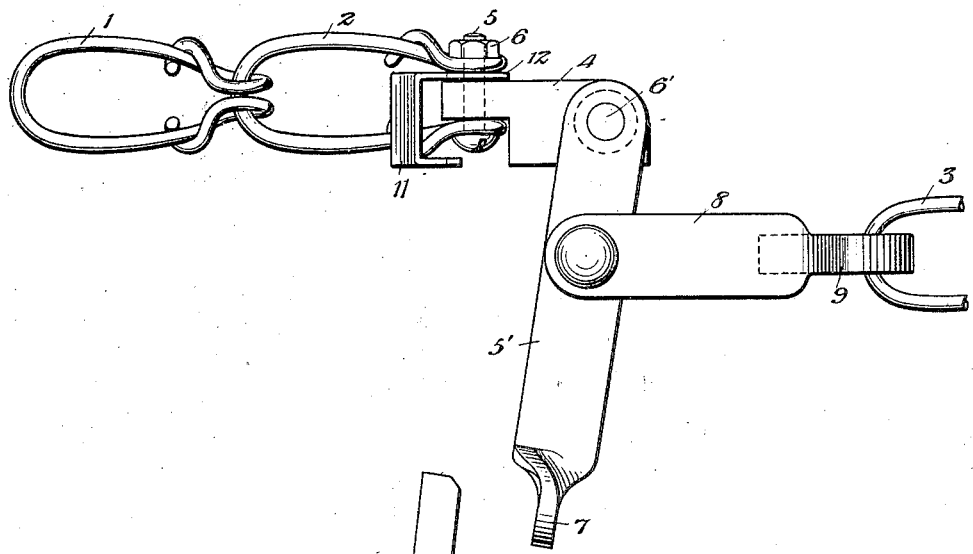
Figure 2 is a similar view showing the device partially opened.
Figure 3:
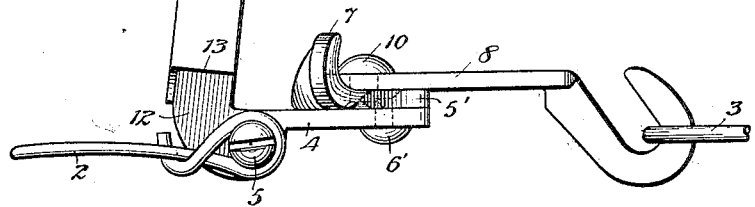
Figure 3 is an edge view of Figure 2.

Referring in detail to the drawings, I have indicated at 1, a tire chain, or rather one run of a tire chain, the adjacent separable end links of which are indicated at 2 and 3 respectively. My improved locking and tightening device is preferably carried by the end link 2. The tightener comprises a fulcrum plate 4 rigidly connected to the end link 2 by a bolt or screw 5 and a nut 6. The bolt 5 passes through the fulcrum plate and tightening of the nut 6 serves to clamp the same firmly between the ends of the wire forming the link so that the link and plate are rigidly coupled.

A lever 5' is fulcrumed at one end to the outer end of the plate, as indicated at 6', and at its opposite end, the lever is twisted to form a finger receiving handle or grip 7. 8 represents a link provided at one end with an integral hook 9 and pivotally connected at its other end to the intermediate portion of the lever 5' by a rivet pin or other appropriate securing device 10.

The bolt 5 which serves to couple the fulcrum plate and the link 2, also provides pivotal mounting for a channeled locking member 11. This channeled locking member includes an extended flanged portion or ear 12 receiving the bolt and providing pivotal mounting for the locking member.

The manner of use of the device is as follows:—When it becomes desirable to tighten and lock a chain, the lever 5' is swung to move the link away from the fulcrum plate and project the hook 9 into extended position. The link 3 of the chain may then be engaged by the hook 9 and the lever 5' swung backwardly to retract the link 8, it being readily seen that this swinging movement of the lever varies the distance between the pin 10 and the attached end of the fulcrum bar, thereby serving to tighten a chain or pull the ends of the same toward one another. When the lever 5' is swung to its full rear position, it overlies and is in alignment with the plate 4 and the link 8 overlies and is in alignment with the lever 5'. A recess 13 in the locking member 11 permits this swinging movement of the lever. After the parts have been moved into alignment, as seen most clearly in Figure 1, the channeled locking member is swung down, its flanged sides straddling the plate, lever and link, and preventing pivotal movement of all of these members, and consequently, preventing the accidental loosening of the chain.

In the particular embodiment of the invention shown, it will be seen that it is possible to take up about three inches of slack on the chain with my improved tightening device, this distance of course, being twice the distance between the fulcrum point 10 of the link and the fulcrum point 6' of the lever.

Although I have illustrated one of the preferred embodiments of my invention, it will be evident that various slight changes and alterations might be made in the general form and arrangement of the parts described without departing from the invention, and hence I do not wish to limit myself to the precise details set forth, but shall consider myself at liberty to make such slight changes and alterations as fairly fall within the spirit and scope of the appended claims.

I claim:

1. In a chain tightener, a plate, a lever fulcrumed on the plate, a link pivoted on the lever, means whereby swinging of the lever moves the lever and link into alignment with the plate, and a longitudinally channeled locking member pivoted at one end on the plate and including side flanges adapted to straddle and embrace said link, lever and plate.

2. In a chain tightener, the combination with a chain, of a plate carried by one end link of the chain, a lever fulcrumed at one end upon the top of the plate, a link fulcrumed at one end upon the intermediate portion of the lever, means at the free end of the link engageable with the other end link of said chain, means whereby swinging of the lever in one direction moves the link and lever into superimposed relationship and longitudinal alignment with the plate, and means for locking said movable parts in this position, said last mentioned means comprising a longitudinally channeled locking member pivoted at one end to the plate and including side flanges adapted to straddle and embrace said movable parts.

3. In a chain tightener, the combination with a chain, of a plate carried by one end link of the chain, a lever fulcrumed at one end upon the top of the plate, a link fulcrumed at one end upon the intermediate portion of the lever, means at the free end of the link engageable with the other end link of said chain, means whereby swinging of the lever in one direction moves the link and lever into superimposed relationship and longitudinal alignment with the plate, and means for locking said movable parts in this position, said last mentioned means comprising a channeled locking member pivoted at one end to the plate and adapted to straddle and embrace said movable parts, said locking member being formed with a cutaway portion to permit swinging of the lever and link in one direction.

VRATISLAV KUBELKA.